United States Patent [19]

Tomita et al.

[11] Patent Number: 5,062,254
[45] Date of Patent: Nov. 5, 1991

[54] METHOD FOR MAKING AN OPTICAL FIBER COATING DISPENSER PACKAGE

[75] Inventors: Akira Tomita, Redwood City; Stephen H. Diaz, Palo Alto; Robert S. Dubrow; Michael Feldman, both of San Carlos, all of Calif.

[73] Assignee: Raychem Corporation, Menlo Park, Calif.

[21] Appl. No.: 601,813

[22] PCT Filed: May 19, 1989

[86] PCT No.: PCT/US89/02197
§ 371 Date: Oct. 31, 1990
§ 102(e) Date: Oct. 31, 1990

[87] PCT Pub. No.: WO89/11668
PCT Pub. Date: Nov. 30, 1989

[51] Int. Cl.⁵ .......................... B05D 1/26; B65B 7/26
[52] U.S. Cl. ...................... 53/467; 118/200; 118/304; 156/69; 427/256

[58] Field of Search ............ 427/163, 256, 169, 430.1, 427/443.2, 230208.6; 118/200, 72, 209, 216, 255, 264, 270, 300, 304; 156/69; 53/467; 264/2.2

[56] References Cited

U.S. PATENT DOCUMENTS

| | | | |
|---|---|---|---|
| 3,240,854 | 3/1966 | Ewer | 264/2.2 |
| 3,423,488 | 1/1969 | Bowser | 264/2.2 |
| 4,227,673 | 10/1980 | Goodwin et al. | 264/2.2 |
| 4,257,988 | 3/1981 | Matos et al. | 264/2.2 |
| 4,586,316 | 5/1986 | Backman | 53/467 |

Primary Examiner—Willard Hoag
Attorney, Agent, or Firm—Dennis E. Kovach; Herbert G. Burkard

[57] ABSTRACT

A method for making a dispenser-package for holding a small quantity of fiber-optic coating material and for use in applying same to a fiber optic.

The sealant or coating material is introduced into container with a hypodermic needle.

4 Claims, 4 Drawing Sheets

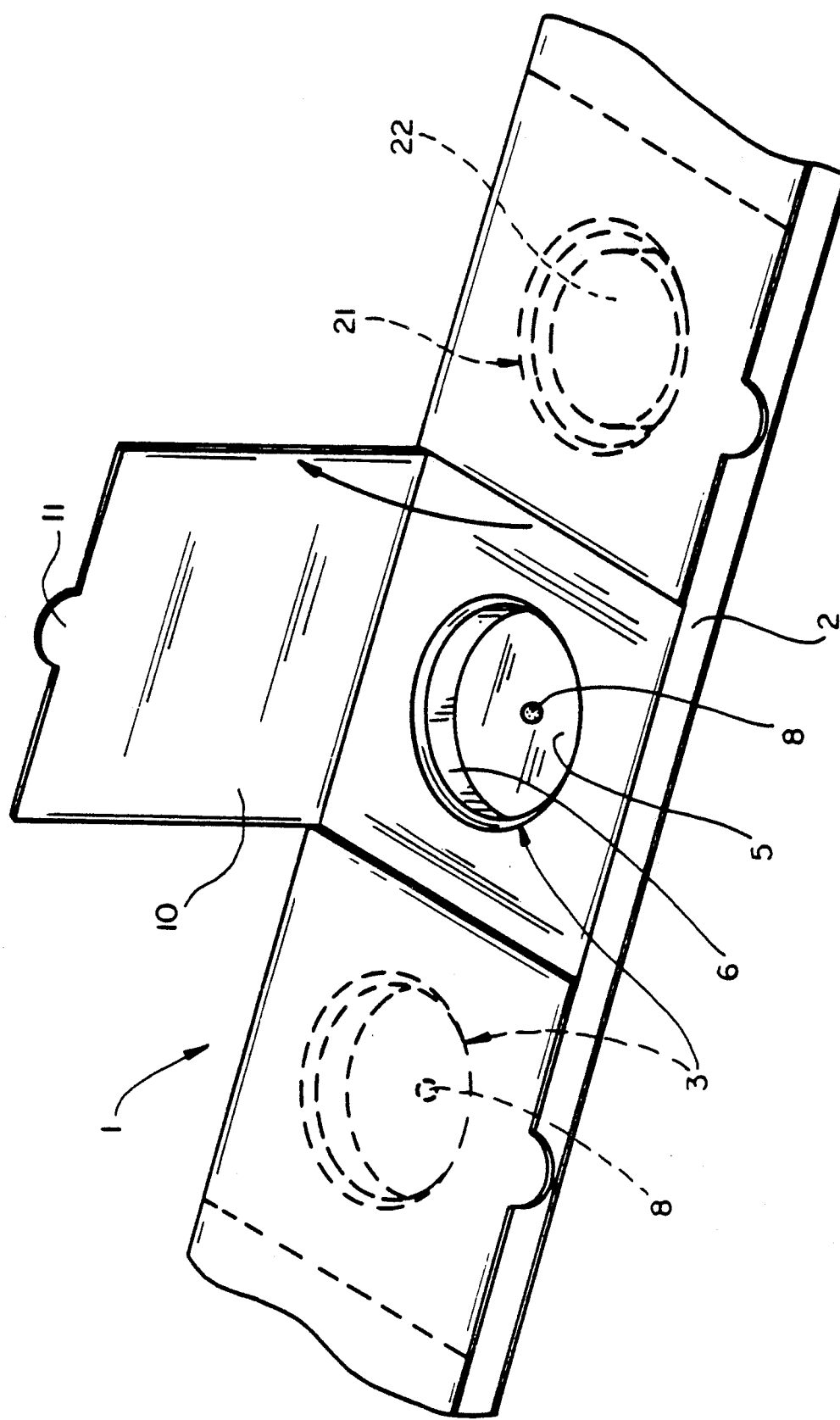
FIG_1

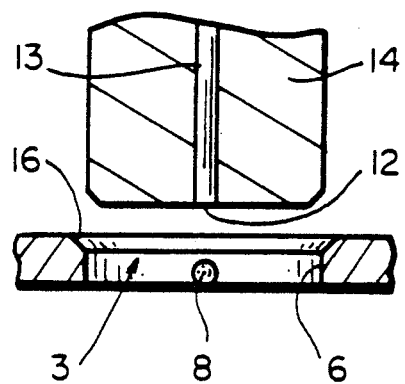
FIG_2
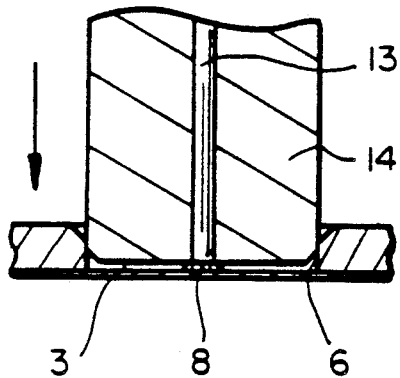
FIG_3
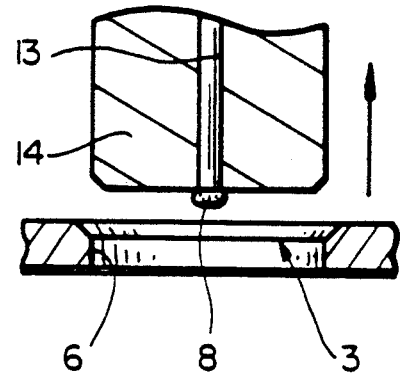
FIG_4
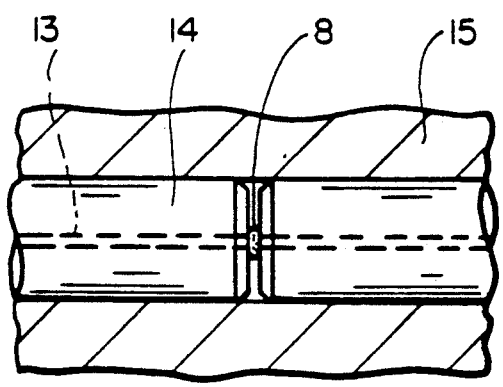
FIG_5

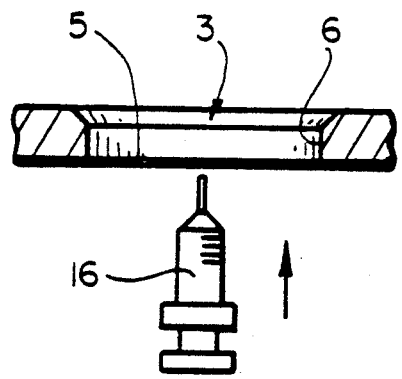
FIG_6
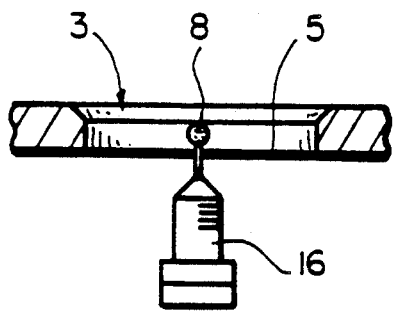
FIG_7
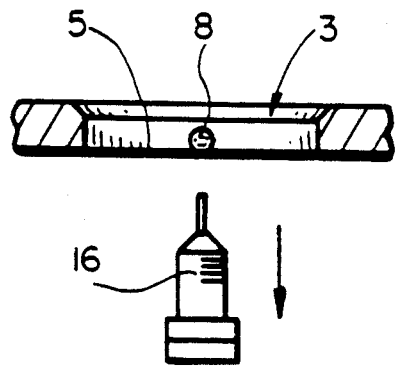
FIG_8
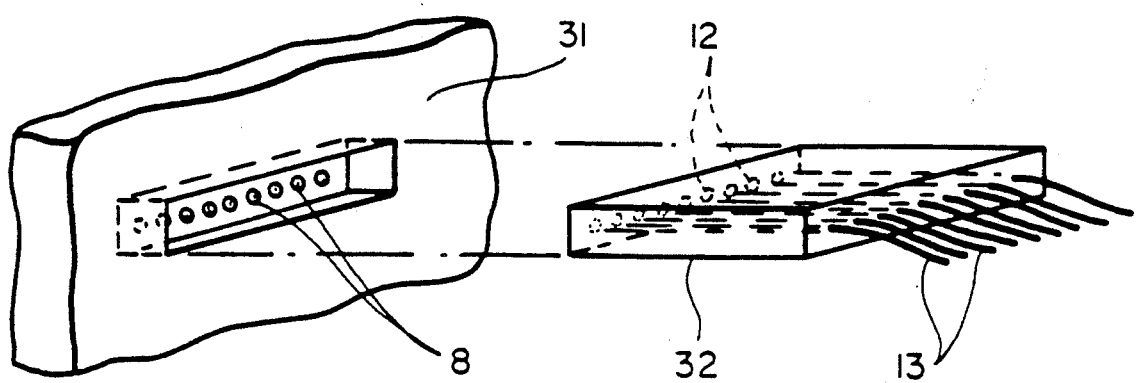
FIG_9

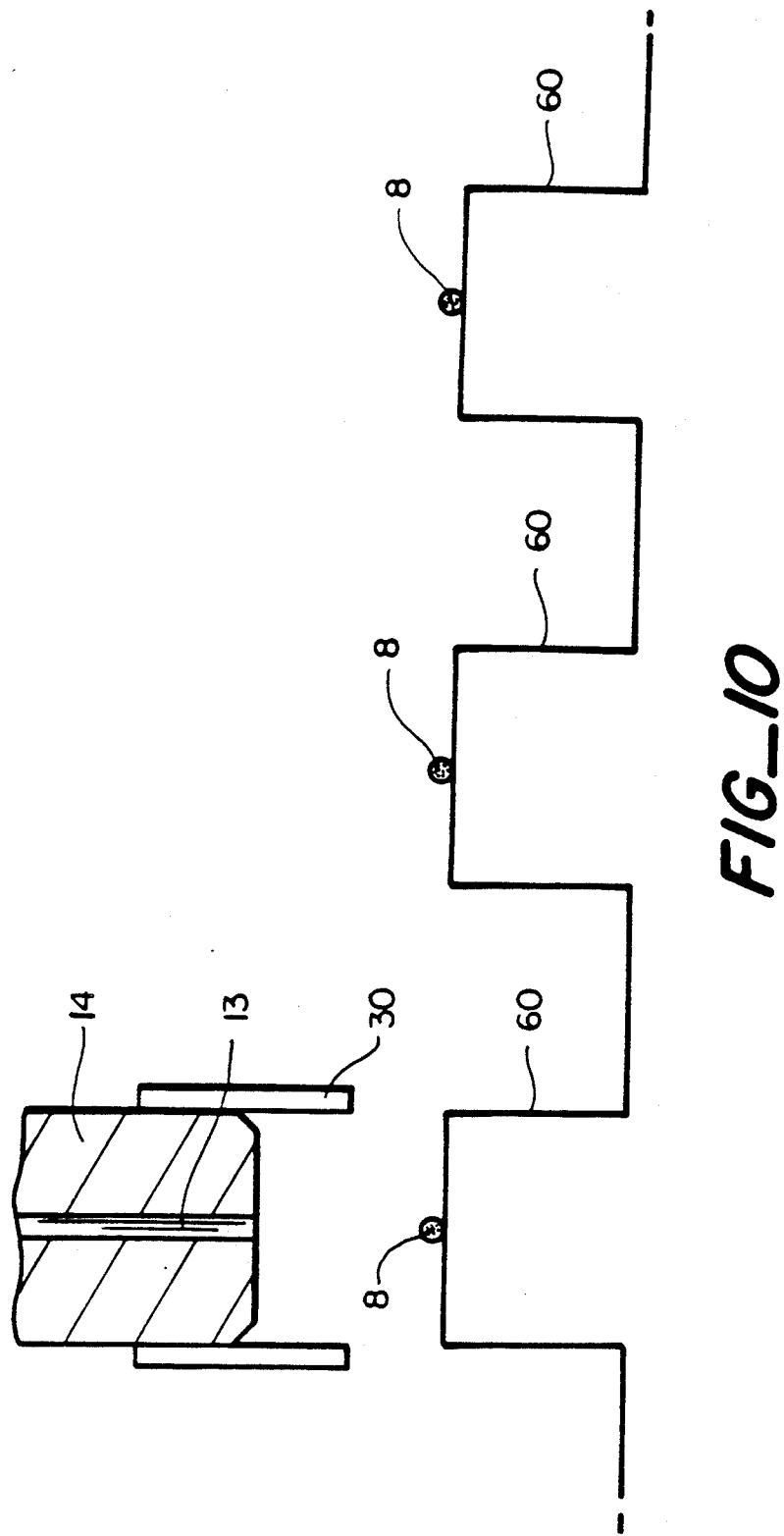

METHOD FOR MAKING AN OPTICAL FIBER COATING DISPENSER PACKAGE

BACKGROUND OF THE INVENTION

The present invention relates to articles and methods for disposing a coating material onto an end of an optical fiber to be terminated.

Optical fiber is widely being deployed for information transfer applications and in a variety of sensor applications. A common requirement in the optical fiber industry is to provide efficient and convenient methods of connecting an optical fiber to either a light source, a light detector, another optical fiber, an optical fiber coupler, etc. A common method previously proposed is to simply leave an air gap between an end of the optical fiber being terminated and its mating optical element, and this method is disadvantageous since light is required to pass from the optical fiber core, into air and then into a mating optical element (e.g. another fiber core). A difference in the indices of refraction between these adjacent materials (core, air, core) causes Fresnel reflections to be created at medium interfaces, and these reflections generate noise as well as excessive optical losses.

Another method for terminating an optical fiber requires that the fiber be disposed in physical contact with its optical element, this method being disadvantageous since the fiber end must be carefully polished to achieve acceptable throughput losses as well as to eliminate reflections. Also, the fiber end can subsequently be damaged if subjected to vibrations or during numerous mating cycles.

Oils and greases have also been proposed to be disposed in contact with an optical fiber termination so as to create a uniform index of refraction medium for the light to travel through across an optical fiber connection, however, all such methods are disadvantageous since convenient methods of applying the grease or oil have yet to be proposed.

Finally, it has also been proposed to dispose elastic materials on an end of an optical fiber contact for creating an index matching medium through which the light can pass. Specifically, U.S. Pat. No. 4,512,630 discloses a method whereby an applicator tip is disposed in a liquid and then retracted so as to hold a drop of the liquid which is then applied to an end of an optical fiber contact. The liquid is then cured on the contact end. Again, this method is disadvantageous since it is quite craft sensitive to implement, especially by unskilled workers in the field, and it also tends to be messy. In addition, it is also difficult to cure the liquid subsequent to application.

Another previously disclosed method for disposing an index matching solid substance onto an end of an optical fiber is disclosed in U.S. Pat. No. 4,436,366, this patent teaching disposing an appropriate index matching layer coating on a substrate film, then drying the coating, and then covering the coating with a protective layer. In use, the protective layer is stripped from the coating and an optical fiber contact is disposed in contact with the coating while simultaneously cross-linking the coating so as to allow it to adhere to the optical fiber contact end. Again, the disadvantage with this technique is that it is not easily implemented by relatively unskilled workers, and hence it is not convenient or economical to use in practice.

The methods of both of these patents are further disadvantageous since the fiber coatings produced are permanently applied to the fibers which allows the coatings to become contaminated or physically damaged, in which case new fiber terminations need to be prepared.

SUMMARY OF THE INVENTION

It is an object of the present invention to provide an optical fiber coating material dispenser which eliminates the above-noted drawbacks.

Specifically, one object of the invention is to provide an optical fiber coating material dispenser which is easy to make and which has a virtually unlimited shelf life.

It is a further object of the invention to provide an optical fiber coating material dispenser which is extremely craft friendly to use, even by relatively unskilled personnel, and which is yet quite effective in applying a coating material onto an optical fiber end which is functionally superior to coating material application methods previously proposed.

These and other objects of the invention are achieved by an optical fiber coating material dispenser which includes a reservoir formed in a substrate, the reservoir including a coating material on a top surface of a reservoir floor which is preferably positioned so as to be precisely located on the reservoir floor relative to sidewalls of the reservoir such that when an optical fiber contact having an optical fiber therein is inserted into the reservoir such that side surfaces of the contact register with the reservoir sidewalls the coating material is accurately positioned on the end of the optical fiber. The coating material can be either a liquid, a grease, or an elastic material, through elastic materials are most preferred since elastic materials are most easily removed from optical fiber connectors and hence facilitate cleaning of such connectors. Preferably, the coating material preferentially adheres to the end of the optical fiber rather than the reservoir floor to facilitate application of the coating material onto the end of the optical fiber. Another advantageous feature of the invention is the use of a transparent reservoir floor which facilitates placement of the coating material on the top of the reservoir floor during manufacturing and also aids in confirming accurate and appropriate placement of the coating material onto the end of the optical fiber. The dispenser also preferably includes means for first cleaning the optical fiber end prior to disposing the coating material thereon.

The invention further includes preferred methods of making the optical fiber coating material dispenser, methods of using the dispenser, and an optical fiber contact formed by disposing a coating material on an end of an optical fiber secured therewithin utilizing the teachings of the invention.

These and other objects of the invention will be more apparent by reference to the accompanying drawings and detailed description.

BRIEF DESCRIPTION OF THE DRAWINGS

FIG. 1 is a perspective view of a plurality of optical fiber coating material dispensers according to the invention;

FIGS. 2–4 are sequential drawings showing a preferred method of applying a coating material onto an end of an optical fiber;

FIG. 5 is a plan view of an optical fiber contact having a coating material on an end of an optical fiber secured to a mating optical element;

FIGS. 6-8 are sequential views of one preferred method of making the dispenser of the invention; and FIG. 9 is a view of a multiple optical fiber contact terminations for use with the present invention.

FIG. 10 illustrates an alternative preferred embodiment of a guiding means for registering a fiber end with a coating material.

DETAILED DESCRIPTION OF THE INVENTION

A first preferred embodiment of the invention will be explained by reference to FIG. 1. Referring to this figure, a coating dispenser 1 includes a support 2 which has formed therein a cavity or reservoir 3 which includes a reservoir floor 5 and a reservoir sidewall 6, the sidewall 6 being cylindrical in the embodiment illustrated. A coating material 8 is disposed on a top surface of the reservoir floor 5, as illustrated, and the reservoir 3 is preferably sealed by cover 10 having a tab 11, the cover having a perimeter secured to a top surface of the sidewall 6.

The sidewall 6 is shaped and sized so as to function as a guiding means which surrounds the support 2 and the coating material 8. Specifically, the guiding means is sized so as to be able to precisely and accurately receive an end 12 of an optical fiber 13 so as to be capable of guiding the optical fiber end towards the support and the coating material so that a core of the optical fiber will contact the coating material as the optical fiber end is guide by the guiding means. In other words, an inside diameter or shape of the walls 6 is shaped so as to be relatively precisely registrable with an outside diameter shape of whatever element surrounds the optical fiber, usually an optical fiber contact, such that a tolerance governing any difference between the sizes of the contact and the sidewall 6 is not sufficiently large to allow the optical fiber end 12 to miss the coating material.

Preferably, an inside perimeter shape of the sidewall 6 is complementary to an outside perimeter shape of an optical fiber contact 14 (FIG. 2) on which the coating material 8 is to be disposed such that these surfaces are registrable, one with the other, so that when the contact is inserted into the reservoir 3 the coating material is oriented so as to come in contact with the end 12 of an optical fiber core and, if desired, the cladding of the fiber, the fiber being secured to the optical fiber contact.

According to the embodiment of FIG. 1, the guiding means comprises the sidewall 6 which extends upward from the support 2 so as to form the cavity or reservoir 3. According to an alternative embodiment illustrated in FIG. 10, the guiding means could comprise an extension 30 which extends beyond an end of the fiber contact 14 and is securely fixed thereto, with an inside perimeter shape of the extension 30 being registrable with an outside perimeter shape of sidewalls 60 extending from the support 2. In this case the sidewalls 60 and support 2 form a protrusion or hill rather than a cavity or reservoir as in FIG. 1. According to the FIG. 10 embodiment, the extension 30 slides relative to the sidewall 60, and a tolerance between a difference in the shapes of these elements is such that again the coating material 8 is always oriented so as to contact a core of the optical fiber when the optical fiber is urged towards the support 2.

FIGS. 2-4 illustrate sequential steps of applying the coating material 8 onto the end 12 of the optical fiber 13 which is secured to the optical fiber contact 14. Specifically, as FIG. 2 illustrates, the optical fiber contact is guided into the reservoir 3 by the sidewall 6, which preferably includes outward tapers 16 near an upper surface thereof so as to facilitate contact insertion therein.

FIG. 3 illustrates a fiber insertion state where the contact 14 has been totally inserted into the reservoir 3 such that the coating material 8 comes in contact with the fiber end 12. Thereafter, as FIG. 4 illustrates, the contact 14 is removed from the reservoir 3. According to the invention, a top surface of the reservoir floor 5, the optical fiber end 12, and the coating material 8 are formed of materials such that the coating material 8 preferentially adheres to the optical fiber end 12 rather than the top surface of the reservoir floor 5. Accordingly, as FIG. 4 illustrates, upon removal of the contact from the reservoir, the coating material 8 adheres to the optical fiber end 12.

The contact 14 with the optical fiber end so coated can then be inserted into any one of an innumerable variety of connectors, with the coating material 8 being available for creating a continuous index matching medium for light to travel through between the optical fiber 13 and a mating optical element. This is most clearly illustrated in FIG. 5 whereby first and second optical fiber contacts are shown in confronting abutting relationship, held together by a connector assembly 15, details of which are not necessary for purposes of description of the invention herein, with the gel ball 8 being squeezed between ends of the optical fibers being connected.

According to the invention, each optical fiber 13 being terminated can have its own coating material disposed thereon such that for every connection two coating materials are involved and mated together, though preferably it is advantageous that only one coating material be disposed on only one of the optical fibers being terminated, so long as a sufficient volume of coating material is provided so that an entire surface of the optical fiber ends are adequately coated.

FIGS. 6-8 illustrate one preferred method of making the coating material dispenser 1. Preferably, the floor 5 of the reservoir 3 is made of an elastic membrane which is piercable and self-healing when pierced with a small diameter object (e.g. diameter less than 300 um). With the floor 5 so constructed, as FIGS. 6 and 7 illustrate, a needle 16, such as a hypodermic needle or similar type of structure, can be used to pierce the membrane 5, the needle being hollow and containing an appropriate coating material therein. Accordingly, when the reservoir floor 5 is pierced from below, a premeasured quantity of the coating material can be ejected from an end of the needle 16 as illustrated in FIG. 7. Thereafter, upon withdrawal of the needle 16 from the reservoir 3, and elasticity of the reservoir floor 5 tears the coating material from the needle 16 and results in the premeasured amount of coating material being disposed in an appropriate location on the reservoir floor 5.

According to the invention, an exact location of the coating material 8 is determined by appropriate registration of the bottom surface of the reservoir floor 5. This method of making the coating material dispenser is advantageous since it is quite simple to dispose an elastic gel type coating material within the reservoir 3 using this method, even when the gel material possesses its elastic properties within the hypodermic needle 16 since the elastic membrane is able to pierce the gel material upon withdrawal of the needle 16 from the reservoir floor 5. Accordingly, one can fill the hypodermic needle with an appropriate material in liquid form and thereafter elasticize the material by any appropriate means, e.g. by cross-linking by using heat, radiation, etc. Thereafter, the elastic material is easily dispensed and placed within the reservoir 3 as described by reference to FIGS. 6-8.

An alternative method of making a coating material dispenser of the invention is to dispose the coating material onto the reservoir floor 5 from above by utilizing any appropriate applicator, such as a hypodermic needle as described or a solid needle which has been dipped into an appropriate coating material which adheres thereto due to surface tension effects. According to this embodiment, the coating material preferably is placed on the reservoir floor in liquid form to ease its placement on the reservoir floor 5, and if a gel type coating material is ultimately desired, the coating material could then be cross-linked within the reservoir 3.

A preferred embodiment of the invention includes a coating material 8 which is elastic, as opposed to a nonelastic material such as a grease. Preferably, the elastic coating material has an ultimate elongation in excess of 20%, preferably in excess of 40%, more preferably in excess of 100%, e.g. in excess of 200% and possibly even 500%. A cone penetration of the elastic coating material 8 is preferably between 30 and 350 ($10^{-1}$ mm), more preferably between 100° and 35° ($10^{-1}$ mm), more preferably between 200 and 300 ($10^{-1}$ mm) e.g. about 220 ($10^{-1}$ mm). Examples of suitable coating materials having properties as described as described in U.S. Pat. Nos. 4,634,207 and 4,600,261 and U.S. application Ser. No. 859,162 filed May 2, 1986, assigned to the assignee of the invention, the disclosures of which are incorporated herein by reference.

According to an alternate preferred embodiment, the coating material 8 can comprise a liquid or grease material which does not possess any significant ultimate elongation or cone penetration values. Though such a material is easily disposed within the reservoir and applied to an end of an optical fiber, as described, a drawback of such a material is that it cannot be as easily removed from an optical fiber contact once it is disposed within an optical fiber contact connector since a pressure exerted against the coating material 8 within the connector may cause a portion of the coating material 8 to remain within the connector upon removal of the contact thus requiring that the connector be cleaned. In any case, the coating material should be substantially transparent at optical frequencies for which the fiber is to be used, and optimally should have an index of refraction which is the same as, or close to, that of the fiber core.

A significant advantage of the invention is that it allows the formation of any desired size of coating material 8 to be applied to an end of an optical fiber within an optical fiber contact. Specifically, the size of the coating material 8 can be made so as to be only slightly larger in diameter than a diameter of either a core or a cladding of the optical fiber. According to a particularly preferred embodiment, the coating material 8, due to its small size, is either substantially spherical in shape one formed on the reservoir floor due to surface tension effects or at least has a dome-like shape. The coating material 8 preferably has a diameter less than ten times a diameter of the fiber cladding, preferably less than five times the cladding diameter, more preferably less than three times the cladding diameter, even more preferably less than two times the fiber cladding diameter, most preferably about the size of the cladding diameter, and it can even be formed so as to be only slightly larger, e.g. 20%, 100% or 200% larger than the core diameter. The invention further includes a coating material size which is smaller, e.g. by 20% or 30%, than a diameter of the fiber cladding the coating material ultimately covering the entire end face of the fiber core since upon fiber contact connection to an optical element the coating material 8 will be flattened out so as to form an elliptical shaped structure. Preferably an outside diameter of the contact is between 3 and 20 times that of the fiber cladding, e.g. preferably greater than 3, 4, 5, 6 or 10 times that of the fiber cladding.

The reservoir floor is preferably made of an elastic material, as described, and is also preferably transparent, a thickness of the membrane preferably being less than 1000 um, more preferably less than 500 um, e.g. about 400 um, and a material from which it is constructed can simply be a thin rubber membrane with sufficient elastic force to insure the get coating is cut upon retraction of the needle.

A further feature of the invention is the provision of a cleaning means disposed within the support 2 for cleaning an end of an optical fiber contact, and in particular an optical fiber contained therewithin prior to disposing the coating material 8 on the fiber end. The cleaning means includes a second reservoir 21 which includes a cleaning pad 22 disposed therein, the cleaning pad 22 including a cleaning agent. With this structure, the contact end is first inserted into the second reservoir 21 so as to bring the fiber end in contact with the cleaning agent on the cleaning pad, the fiber end is then preferentially wiped with a nonlinting cloth or similar material, and subsequently the fiber end is then disposed within the first reservoir 3 so as to dispose the coating material 8 thereon.

The invention works best for coating fibers having ends which are flush with their associated contact end surfaces. However, the invention is also useful with contacts where the fiber end is recessed, preferably recessed by a distance less than one cladding diameter.

An additional advantage of the invention is that the coating 8 is not permanently bonded to the fiber end but yet adheres thereto. Hence, the coating is readily removable from an optical fiber connector upon removal of the fiber so that a connector interior can be kept clean and is easily cleanable. Also, the coating can thereafter easily be removed from the fiber end by simply wiping the end clean. Hence the coating is easily disposable and a new coating can easily be applied to the fiber end without the necessity of reterminating the fiber by additional cleaving steps, for example.

Finally, the invention is particularly useful for use with multiple optical fiber connections. FIG. 9 illustrates a rectangular dispenser 31 having a plurality of coating material spheres 8 therein. An array connector having a plurality of in-line optical fiber ends 12 is inserted into the dispenser 31, and due to the adhesion properties between the coating material spheres 8 and the fiber ends 12 upon withdrawal of the array connector all the fiber ends 12 are appropriately coated, as desired.

Though the invention has been described by reference to certain preferred embodiments thereof, the invention should not be so limited and should be limited only the appended claims.

We claim:

1. A method of making a dispenser for dispensing a coating material onto an end of an optical fiber, comprising the steps of:

piercing an elastic membrane with a hollow needle;

ejecting only a generally spherical quantity of a coating material from the needle;

withdrawing the needle from the membrane, the membrane being constructed so as to substantially seal upon itself upon withdrawal of the needle therefrom and so as to pierce the coating material and separate a mass thereof from the needle such that the coating material mass is disposed on a top surface of the membrane.

2. The method of claim 1, the coating material comprising a nonelastic liquid material, and further comprising the step of hardening the coating material subsequent to withdrawing the needle so as to elasticize the coating material.

3. The method of claim 1, the coating material being elastic and having a cone penetration between 30 and 350 ($10^{-1}$mm) and an ultimate elongation in excess of 20%.

4. The method of claim 1, the membrane being surrounded by sidewalls so as to form a reservoir, and further comprising the step of disposing a cover over the reservoir such that a perimeter section of the cover is secured to a top surface of the sidewalls so as to seal an interior of the reservoir.

* * * * *